UNITED STATES PATENT OFFICE.

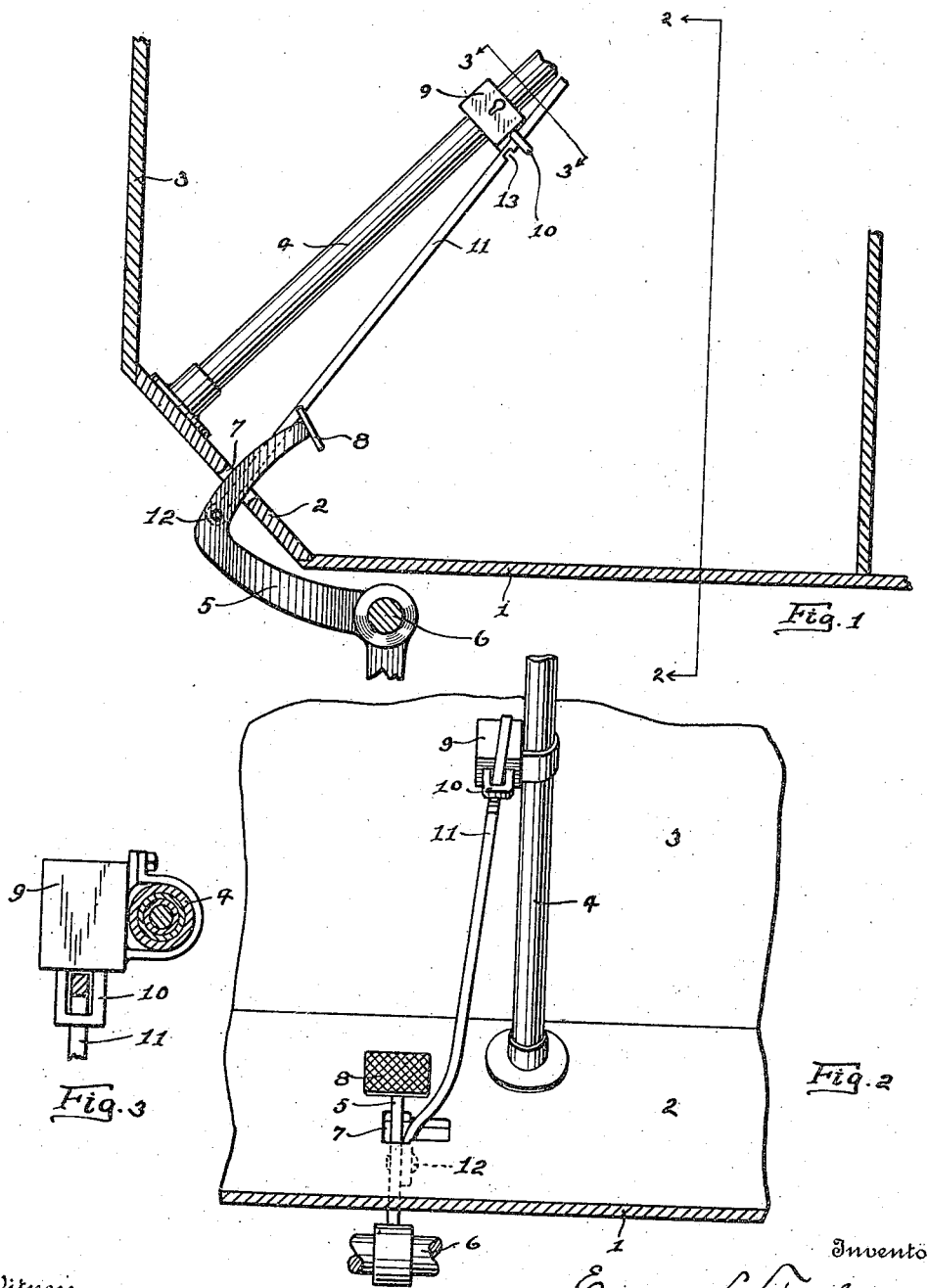

EMERSON L. TAYLOR, OF COLUMBUS, OHIO.

CLUTCH-PEDAL LOCK FOR AUTOMOBILES.

1,250,711. Specification of Letters Patent. Patented Dec. 18, 1917.

Application filed February 26, 1917. Serial No. 150,980.

*To all whom it may concern:*

Be it known that I, EMERSON L. TAYLOR, a citizen of the United States, residing at Columbus, in the county of Franklin and State of Ohio, have invented certain new and useful Improvements in Clutch-Pedal Locks for Automobiles, of which the following is a specification.

My invention relates to a clutch pedal lock for automobiles and the objects of my invention are to provide a simple, inexpensive and effective means for so locking the clutch pedal or foot lever of an automobile as to prevent the operation of the same and thereby prevent any unauthorized use of the machine.

The preferred embodiment of my invention is shown in the accompanying sheet of drawings in which similar characters of reference designate corresponding parts and in which:

Figure 1 is a sectional view through a portion of an automobile body showing a portion of the steering post and my improved connections with the clutch pedal lock and this clutch pedal in partially depressed position.

Fig. 2 is a section on line 2—2 of Fig. 1.

Fig. 3 is a detailed sectional view on line 3—3 of Fig. 1.

1 represents a portion of the horizontal floor of an automobile,

2—the inclined forward foot rest portion thereof, and

3—the dash.

4—represents the steering post which is inclined upwardly and rearwardly from the foot board 2 in the usual manner.

5—represents the usual angular or bell crank shaped clutch lever which is pivoted at 6 and which is shown in partially depressed position. The upper arm of this clutch pedal passes through an opening 7 in the foot board 2 and terminates in a suitable form of pedal plate 8. At a suitable point on the steering post, I rigidly secure a lock casing 9 which is designed to contain any suitable, well-known form of bolt operating lock mechanism. The locking bolt in the present instance however, is of a yoke shape shown at 10 and is at all times projected outward a certain distance from the lock casing.

11 represents a locking rod, the lower end portion of which passes through the floor opening 7 beneath which it is pivotally connected as indicated at 12 to the lower portion of the upper arm of the clutch lever 5. The upper portion of the locking rod 11 passes through the link or yoke like projecting portion of the lock bolt 10. In the lock rod 11, in its upper portion, is formed a notch or recess 13 which when the clutch pedal or lever is in a fully elevated position, may be made to engage the outer end portion of the bolt 10. It is obvious that when thus engaged and the bolt is drawn partially inward within the lock casing by the turning of a lock key or other desirable device, the rod 11 will be locked against upward or downward movement and likewise the clutch pedal will be locked against movement on its pivot 6.

When not in its locked position, it is obvious that the rod 11 will move downward and upward with the corresponding movement of the lever 5 and will in no way interfere with the operation of the clutch lever or other mechanical parts of the machine.

In the majority of, if not in all, automobile engines, the transmission gears cannot be placed in operation until the clutch pedal or lever is forced downward and outward and it will thus be understood that when the locking bar 11 is locked into engagement with the lock bolt 10, the machine cannot move through the operation of its engine.

It will be understood that my invention is particularly designed as a simple and effective means of preventing automobiles being stolen or driven without authority of the owner.

I claim:

1. In clutch pedal locking mechanism for motor vehicles, the combination with a steering post and the clutch operating foot pedal of a motor vehicle, of a key operated lock rigidly mounted upon said steering post, said lock including a bolt of substantially yoke formation, a rod pivotally connected at its lower end to said clutch pedal at a point beneath the floor level of the vehicle, and said rod being provided with a notch at its upper end to fit said lock bolt in order to hold the rod against longitudinal movement.

2. In clutch pedal locking mechanism for motor vehicles, the combination with a steering post and the clutch operating foot pedal of said vehicle, of a lock rigidly secured to the steering post, said lock including a substantially yoke shaped bolt, a rod pivotally secured to the clutch pedal at a point beneath the floor of said vehicle and means provided in the upper end of said rod for engagement with said lock bolt, whereby longitudinal movement of said rod and the coöperative movement of said clutch pedal will be prevented when the link and bolt are interlocked.

In testimony whereof I affix my signature in presence of two witnesses.

EMERSON L. TAYLOR.

Witnesses:
WALTER E. L. BOCK,
A. L. PHELPS.